Sept. 23, 1958  E. C. CARLSON ET AL  2,853,314
HORIZONTALLY, ANGULARLY ADJUSTABLE TRAILER TONGUE
Filed Nov. 29, 1956
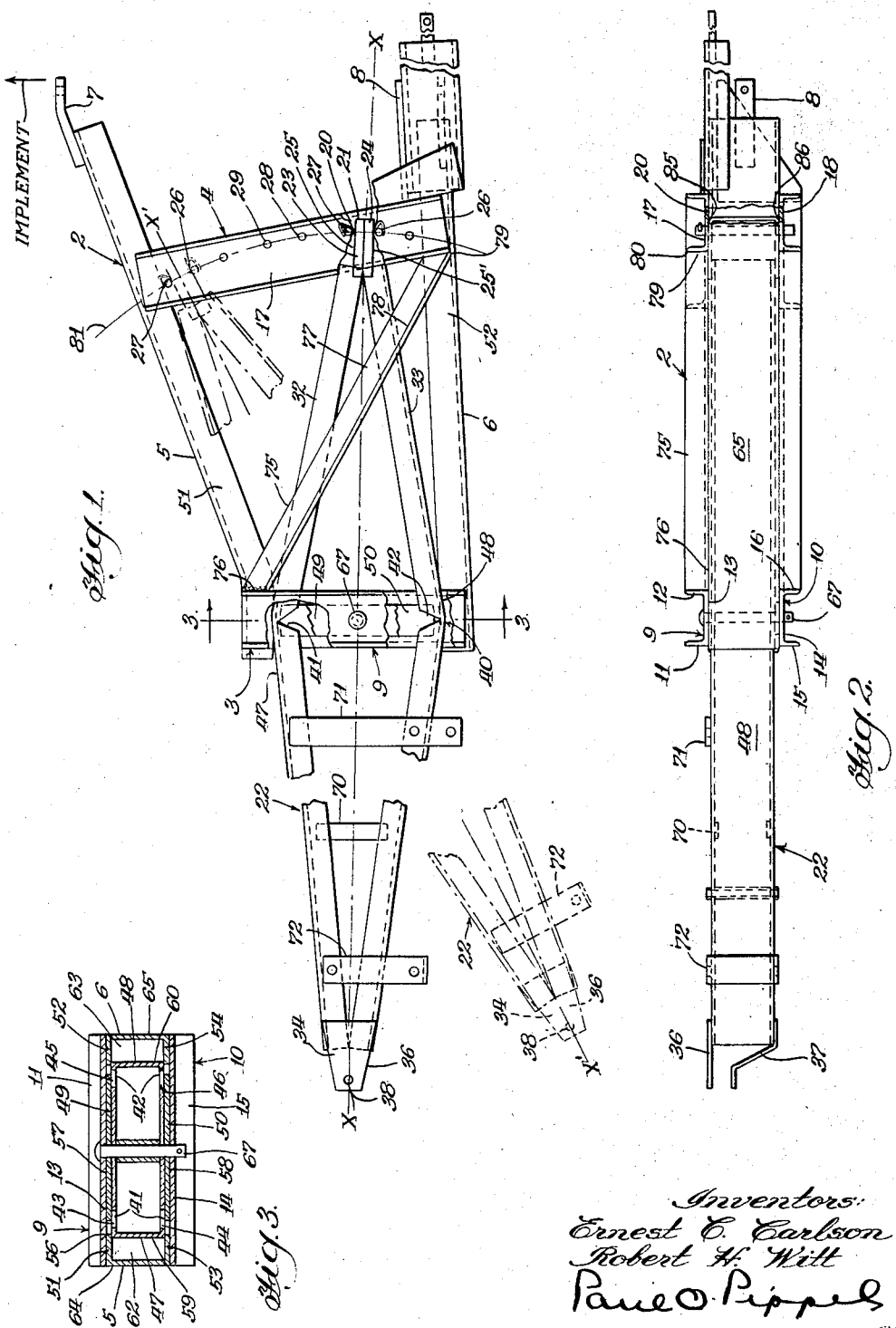
Inventors:
Ernest C. Carlson
Robert H. Witt
Paul O. Pippel

United States Patent Office 2,853,314
Patented Sept. 23, 1958

2,853,314

HORIZONTALLY, ANGULARLY ADJUSTABLE TRAILER TONGUE

Ernest C. Carlson, Wheaton, and Robert H. Witt, Hinsdale, Ill., assignors to International Harvester Company, a corporation of New Jersey Application November 29, 1956, Serial No. 625,022

4 Claims. (Cl. 280—462)

This invention relates to hitches and more particularly to a novel form of dial hitch structure.

In hitching implements to a tractor it is necessary in certain applications to provide a hitch structure commonly known as a dial hitch wherein the hitch is arranged to position the implement in trailing relation at one side of the tractor for operation and directly behind the tractor for transport.

This invention contemplates the provision of a novel hitch of the class described which is of economical and rugged constructtion and efficient in service and which is constituted of a plurality of fabricated members so arranged to provide exceptional rigidity as well as resistance to torsional and bending loads imposed thereon.

A further object of the invention is to provide a novel hitch structure comprising a draft member which provides a wide bearing at its point of pivot to the associated implement supporting frame and wherein the parts are so arranged to distribute the stresses so that the hitch or draft member is swingable laterally without binding.

These and other objects of the invention will become more apparent from the specification and the drawings wherein:

Figure 1 is a plan view of the novel hitch construction with parts broken away and shown in transport position in phantom lines;

Figure 2 is a side elevational view partially broken away of the hitch construction; and Figure 3 is a transverse vertical sectional view taken substantially on the line 3—3 of Figure 1.

Describing the invention in detail and having particular reference to the drawings, there is shown an implement supporting or connected frame 2 which is essentially an A-frame comprising forward and rear cross structures 3 and 4 which interconnect respectively the forward and intermediate portions of the rearwardly diverging generally horizontal side members or legs 5 and 6. The side members 5 and 6 are provided with, at their rear ends, brackets 7 and 8 which are adapted for pivotal connection or other securement to an associated implement not shown which is adapted to extend from the frame leftwardly thereof as viewed from the front end of the structure as shown by the arrow and legend "Implement" in Figure 1. The beam members 4 and 5 are channel-shaped with the flanges thereof extending inwardly and the structure or cross framework 3 comprises a pair of upper and lower channel shaped beam members 9 and 10, the flanges 11 and 12 of the upper member 9 being directed upwardly and its transverse wall 13 providing the bottom of the beam. The beam member 10 has its horizontal wall 14 at its top side and its flanges 15 and 16 depending therefrom. The rear cross structure 4 also comprises top and bottom members 17 and 18 which are channel beam members disposed on top and below the members 5 and 6 the same as members 9 and 10 and weld-connected thereto similarly as are the members 9 and 10 and providing a pocket or a horizontal slot 20 therebetween into which there is entered the rear end 21 of the draft frame generally indicated 22.

The rear end portion 21 is formed of a pair of flat plates 23 and 24 which are preferably weld-connected to each other and provide vertical external abutment faces 25', 25 which abut against the spaced vertical pins 26 and 27 which are entered at opposite sides of the end portion 21 in companion openings 28 and 29 disposed in the top and bottom beam members 17 and 18. Thus, the tail end 21 of the draft frame is located with respect to the frame 2.

The draft frame is constructed of a pair of opposed channel shaped beam members 32 and 33 which are disposed in facing relation toward each other with their flange portions and the beam members 32, 33 are bent and arranged to form a diamond-shaped structure in plan in order to provide a narrow rear end portion and a similarly narrow front end hitch portion 34. The forward extremities of the beam members 32 and 33 are interconnected by plates or gusset members 36 and 37 which are provided with pintle openings 38 for reception of drawbar 10 therebetween and connection therewith as well known to those skilled in the art. The wide intermediate portion of the drawbar or draft frame 22 and generally indicated 40 is formed by bowing the members 32 and 33 outwardly after V-nothching the member 32 at 41 in its top and bottom flanges 43, 44 and member 33 at 42 in its flanges 45, 46, said notches 41 being apexed toward the outer vertical wall 47 of the beam member 32 and the notches 42 being apexed toward the vertical side wall 48 of the beam member 33.

The beam members 32 and 33 are interconnected at their flanges 43, 45 by a cross bearing plate 49 which is disposed thereabove and welded thereto over the notches 41, 42. Similarly, the bottom flanges 44, 46 are interconnected by a bearing plate 50. Plates 49 and 50 form a column. It will be seen that the bearing plate 49 is substantially the thickness of the top flanges 51 and 52 of the channel beam members 5 and 6 and substantially coplanar therewith and spaced at its ends from the opposing edges of said flanges and similarly the bottom plate 50 is essentially of the thickness of the bottom flanges 53, 54 of the beam members 5 and 6. The wide portion 40 of the draft beam structure fits within the pocket 56 developed between the forward cross beams 9 and 10 and adjacent forward ends of members 5 and 6 and the top plate 49 bears against the underside of the bottom wall 13 as at 57 and the bottom plate 50 rests on top of the top plate 14 of the bottom beam member 10 as at 58. It will be seen that the apex portions 59 and 60 of the widened portion 40 telescope or project into the channel pockets or grooves 62 and 63 of the beam members 5 and 6. It will be realized from a consideration of Figure 3 that the beam member 5 comprises an upright exterior wall 64 interconnecting the flanges 51, 53 and that the beam member 6 has an exterior wall 65 interconnecting the flanges 52, 54. It will also be realized that the bottom cross member 10 is weld-connected on its wall 14 to the flanges 53, 54 and that the wall member 13 is weld-connected to the flanges 51 and 52. The wall member 13, the bearing plate 49, the bearing plate 50 and the wall member 14 are provided with vertically aligned openings disposed substantially centrally between the lateral extremities of the pocket 56 which receive a vertical pin 67 to provide a point of pivot on a substantially vertical axis for the draft frame. The draft frame may be interconnected at a plurality of areas by cross connecting members 70, 71 and 72 in order to fully rigidify the structure. The A-frame may be further rigidified by a diagonal angle or L-beam 75 which may be connected at its forward end as by welding at 76 to the top flange 51 of the beam member 5 and at its forward extremity and to the rear upstanding flange 12 of the beam member 9. Member 75 extends diagonally to the beam member 6 and may be welded with its bottom flange 77 to the top flange 52 of the beam member 6 and that flange 77 and also the upstanding flange 78 may be sheared diagonally and may be welded as at 79 to the forward flange 80 of the channel shaped rear beam cross member 17.

It will be seen that the paired openings 28 and 29 are disposed on a common arc indicated at 81 (Figure 1) so that they are always located at opposite sides of the rear extremity 21 of the draft beam structure.

In operation, when it is desired to offset the implement supporting frame 2 laterally with respect to the center line X—X of the draft frame, the beam member is swung in a clockwise direction from a central location to dispose the rear extremity toward member 6 on the leftward side of the A-frame as viewed from the front whereupon the pins 26 and 27 are located at opposite sides of the tail end portion 21 in the proximate openings 26 and 27. If it is desired to swing the unit or the draft frame to trail directly behind the draft frame or the tractive vehicle then the hitch is swung in a counterclockwise direction from the position shown in Figure 1 and disposed in the position shown in phantom lines in Figure 1 and the pins 26 and 27 are then inserted into the proximate openings 28 and 29 whereby the frame and the implement it supports would swing directly behind the hitch point with the central axis of the pulling force on the line X'X' as seen in phantom lines in Figure 1.

The end portion 23, 24 abuts at its upper and lower edges as at 85 and 86 against the top and bottom rear cross-members 17 and 18. The lateral holding means 26, 27 thus restricts lateral movement of the rear end portion of the tongue 22 but accommodates fore and aft and vertical movement thereof so that vertical loads are transmitted directly to the rear cross-members and the fore and aft to the pin 67 and then to the A-frame.

The position of the diagonal member 75 takes into account the torsional loading on the A-frame when the implement which overhangs the frame in the direction of the arrow is offset the maximum with respect to the axis X—X as seen in Figure 1.

What is claimed is:

1. In a hitch, the combination of an A-frame having means for connection to an implement and comprising a pair of laterally spaced side beams disposed in forwardly converging relation, pairs of top and bottom front and rear cross-members interconnecting forward and intermediate portions of said side beams and developing front and rear pockets therewith, a draft structure disposed in telescoped relation with said A-frame and including a pair of laterally spaced beam members having front and rear extremities, means interconnecting said front extremities of the beam members and including means for connection to a drawbar of an associated tractive vehicle, means interconnecting said rear extremities of said beam members and including abutment means defining the rear end portion of said draft structure projecting into said rear pocket, said beam members being bowed outwardly away from each other intermediate their ends and providing apices, a column interconnecting said beam members at said apices and providing an intermediate wide bearing portion disposed within said front pocket and including means in bearing engagement with the adjacent front top and bottom cross-members, means pivotally connecting said column substantially centrally between its lateral extremities on a generally vertical axis to the adjacent cross-members, and holding means for selectively holding said rear end portion of the draft structure with said rear cross-members in a plurality of laterally disposed positions against lateral swinging movement.

2. In a hitch, the combination of an A-frame having means for connection to an implement and comprising a pair of laterally spaced side beams disposed in forwardly converging relation, pairs of top and bottom front and rear cross-members interconnecting forward and intermediate portions of said side beams and developing front and rear pockets therewith, a draft structure disposed in telescoped relation with said A-frame and including a pair of laterally spaced beam members having front and rear extremities, means interconnecting said front extremities of the beam members and including means for connection to a drawbar of an associated tractive vehicle, means interconnecting said rear extremities of said beam members and including abutment means defining the rear end portion of said draft structure projecting into said rear pocket, said beam members being bowed outwardly away from each other intermediate their ends and providing an intermediate wide bearing portion disposed within said front pocket and including means in bearing engagement with the adjacent front top and bottom cross-members, means pivotally connecting said intermediate portion substantially centrally between its lateral extremities on a generally vertical axis to the adjacent cross-members, and holding means for selectively holding said rear end portion of the draft structure with said rear cross-members in a plurality of laterally disposed positions against lateral swinging movement only, said side beams of the A-frame being channel shaped and each presenting an inwardly facing channel groove pocketing the adjacent part of the wide bearing portion of the draft structure, and said holding means comprising a pair of pins extending through holes in said rear cross-members disposed at opposite sides of said abutment means in obstructing relation thereto for restraining lateral movement of the rear end portion of said structure and having sliding engagement fore and aft and vertically.

3. In a dial hitch, the combination of a frame comprising a pair of laterally spaced side beams disposed in forwardly converging relation providing inwardly facing lateral pockets and cross-members interconnecting forward and intermediate portions of said side beams and forming front and rear pockets therewith, means on the frame for connection to an implement, a draft tongue having a rear end portion in said rear pocket and extending forwardly therefrom and having an intermediate portion in said front pocket and a forward portion extending forwardly of the frame and having a forward hitch point, said tongue having a pair of opposed V-shaped side members interconnected at corresponding ends, said intermediate portion comprising a column extending between and interconnecting said V-shaped members at their apices, said side members and column formed and arranged to provide a truss structure for lateral loading, means pivotally connecting said intermediate portion to said cross-members interconnecting the forward portions of the side beams for accommodating horizontal swinging movement of the tongue, means on at least one of said rear cross-members for holding the rear portion of the tongue against lateral swinging movement, said side members formed and arranged to snugly nest into respective lateral pockets in certain positions of said tongue.

4. In a dial hitch, the combination of an A-frame comprising a pair of laterally spaced side beams disposed in forwardly converging relation and pairs of top and bottom cross-members interconnecting forward and intermediate portions of said side beams and forming front and rear pockets therewith and having rear portions including means for mounting an implement extending laterally outwardly from one side thereof, a draft tongue having a rear end portion in said rear pocket and extending forwardly therefrom and having an intermediate portion in said front pocket and a forward portion extending forwardly of the A-frame and having a forward hitch point, means pivotally connecting said intermediate portion to said front top and bottom cross-members for accommodating horizontal swinging movement of the tongue, means on at least one of said rear cross-members for holding the rear portion of the tongue against lateral swinging movement and accommodating vertical and fore and aft movement and a beam element connected at one end to said side beam element at said one side of the frame adjacent to the forward portion thereof and extending diagonally rearwardly to an intermediate portion of the other side member and connected thereto, said tongue comprising a pair of opposing beams V-shaped in plan with the apices thereof oppositely directed at said intermediate portion and forming a wide bearing area at said intermediate portion thereof, and said side beams of the A-frame being channel shaped and presenting facing pockets receiving the apices of respective beams of said tongue.

References Cited in the file of this patent

UNITED STATES PATENTS

| | | |
|---|---|---|
| 871,613 | Neste | Nov. 19, 1907 |
| 1,379,982 | Hartsock | May 31, 1921 |
| 1,389,840 | Neely | Sept. 6, 1921 |
| 1,529,941 | Bradley | Mar. 17, 1925 |
| 1,906,322 | Livesay | May 2, 1933 |
| 2,665,144 | Birdwell | Jan. 5, 1954 |
| 2,780,479 | Frieberg | Feb. 5, 1957 |